(12) United States Patent
Schediwy et al.

(10) Patent No.: US 6,642,857 B1
(45) Date of Patent: Nov. 4, 2003

(54) CAPACITIVE POINTING STICK

(75) Inventors: Richard Schediwy, Union City, CA (US); Mark Huie, Palo Alto, CA (US); Charles Cook, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 482 days.

(21) Appl. No.: 09/766,464

(22) Filed: Jan. 19, 2001

Related U.S. Application Data
(60) Provisional application No. 60/176,994, filed on Jan. 19, 2000.

(51) Int. Cl.[7] .................................................. H03K 17/94
(52) U.S. Cl. ...................... 341/20; 345/161; 74/471 XY
(58) Field of Search ...................... 341/20, 33; 345/161, 345/157; 74/471 XY

(56) References Cited

U.S. PATENT DOCUMENTS

| | | | |
|---|---|---|---|
| 4,422,035 A | 12/1983 | Risko | |
| 4,719,538 A | 1/1988 | Cox | |
| 5,012,231 A | 4/1991 | Felsenstein | 340/709 |
| 5,521,596 A | 5/1996 | Selker et al. | 341/22 |
| 5,541,622 A | 7/1996 | Engle et al. | 345/161 |
| 5,576,704 A * | 11/1996 | Baker et al. | 341/20 |
| 5,696,535 A | 12/1997 | Rutledge et al. | 345/156 |
| 5,786,997 A | 7/1998 | Hoyt et al. | |
| 5,861,583 A | 1/1999 | Schediwy et al. | 178/18.06 |
| 5,889,507 A | 3/1999 | Engle et al. | |
| 5,914,465 A | 6/1999 | Allen et al. | 178/18.06 |
| 5,949,354 A * | 9/1999 | Chang | 341/33 |
| 5,956,018 A | 9/1999 | Pejic et al. | 345/157 |
| 5,973,668 A | 10/1999 | Watanabe | |
| 6,480,183 B1 * | 11/2002 | Van Ruymbeke et al. | 345/161 |

* cited by examiner

*Primary Examiner*—Michael Horabik
*Assistant Examiner*—Albert K. Wong
(74) *Attorney, Agent, or Firm*—Sierra Patent Group, Ltd.

(57) ABSTRACT

A device for entering data into a computer and for manipulation of a cursor. The device includes a joystick, a conductive spring and at least one capacitive force sensor. The conductive spring is capable of being deflected by force applied to the joystick which is measured by the capacitive force sensor.

17 Claims, 4 Drawing Sheets

CAPACITIVE POINTING STICK

PRIORITY CLAIM

U.S. Provisional Application No. 60/176,994 filed Jan. 19, 2000.

TECHNICAL FIELD OF INVENTION

The present invention involves a computer pointing stick implementing capacitive sensors.

BACKGROUND OF THE INVENTION

Pointing devices are an essential component of modern computers. The pointing device allows the user to move a cursor on the display of a computer. While the mouse is still the most common type of pointing device, the "pointing stick" has become more popular in recent years. These pointing devices consist of a small analog joystick usually between the keys of a keyboard; for example see U.S. Pat. No. 5,521,596 to Selker. One typical implementation of a pointing stick consists of a post placed on top of a number of force sensing resistors (FSR), but there are other possible implementations. While FSR's are simple and well-known technology, pointing sticks that use FSR's suffer several drawbacks. First, sticks that use FSR's require a large number of additional electrical components to amplify their signals to a measurable level. Second, most FSR implementations are quite susceptible to external noise sources. Third, FSR's may be more expensive and less rugged than other sensing methods. Fourth, FSR's may be quite susceptible to changes in temperature. Capacitive sensors are well known in the art, and have been disclosed for use in pointing devices. For example, U.S. Pat. No. 5,521,596 discloses a capacitive touch pad for use as a pointing device. Capacitive sensors can also be used to sense force. Force sensing capacitors (FSC) can be used to implement a pointing stick in ways analogous to the use of FSR's. Capacitive pointing sticks offer several benefits over the use of FSR's. First, capacitive pointing sticks can be implemented with very few electrical components other than the sensing ASIC, allowing for a smaller and less expensive device. Second, capacitive sensors can also be made less susceptible to external interference. Third, FSC's can be made to be more rugged than FSR's and they are much more resistant to changes in temperature than FSR's.

The purpose of the present invention is to create a device that uses capacitive sensing in a pointing stick and to define some of the details of that implementation.

SUMMARY OF THE INVENTION

The present invention is directed to the use of a capacitive sensor to implement a pointing stick. The sensor element can assume a number of different embodiments as discussed below, their common element being the use of a capacitive rather than resistive sensor for implementation.

DETAILED DESCRIPTION OF THE INVENTION

Figure 1A:
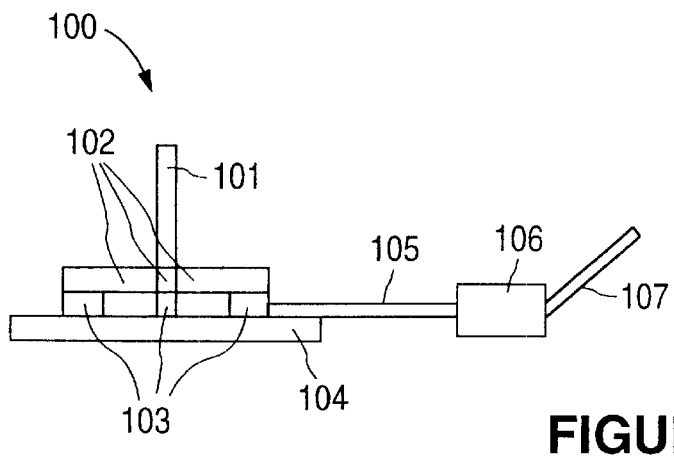
Figure 1B:
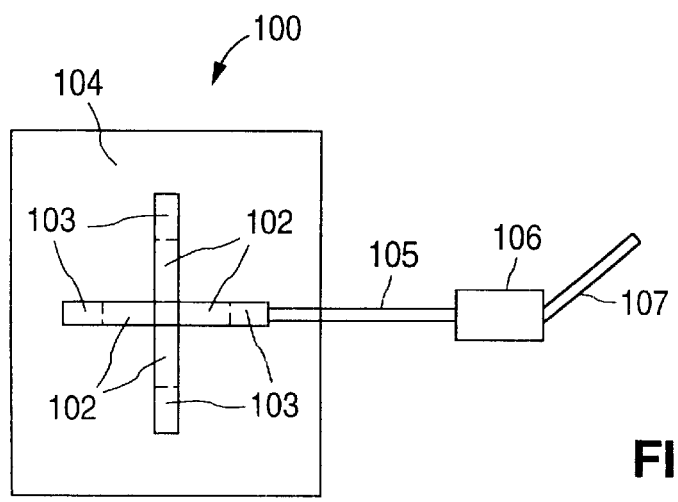

For reference, FIGS. 1A and 1B show one implementation of a prior art FSR pointing stick 100 in side and top view. Stick 101 is rigidly attached to cantilevers 102. Cantilevers 102 are attached to the top of FSR's 103. In turn, FSR's 103 are attached to the top of base 104. As a force is applied to stick 101, cantilevers 102 transmit the force to FSR's 103 to produce analog signals. These signals are carried along wires 105 to processor 106. Processor 106 compares the relative signals of the four FSR's 103 and determines the direction and magnitude of the force applied to the stick. This information is converted to cursor motion information and sent to the host via cable 107. The details of the conversion from FSR outputs to cursor motion are well known in the art; see U.S. Pat. No. 5,012,231. Other implementations of this pointing stick involve three FSR's instead of four. Yet a third implementation involves a fifth FSR or other pressure sensor used for measuring downward forces independently from horizontal forces.

Figure 2A:
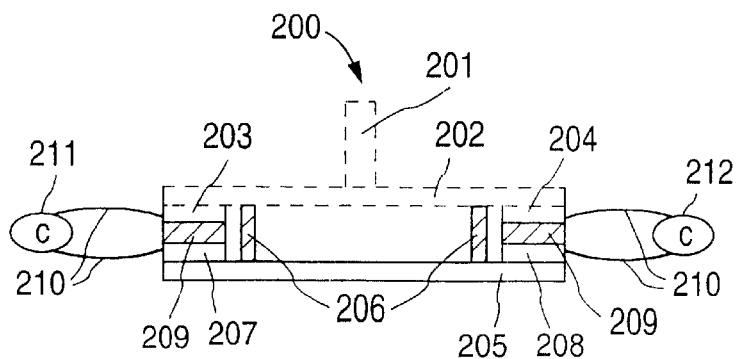

FIG. 2A shows the implementation of one dimension of a capacitive pointing stick 200. Stick 201 is rigidly fixed to support member 202. Conductive plates 203 and 204 are attached to one face of support member 202. Support member 202 is attached to base 205 by springs 206. Plates 207 and 208 are located on base 205 opposite plates 203 and 204 respectively. The stack of plate 203, compressible dielectric 209, and plate 207 forms one capacitor, while plate 204, dielectric 209, and plate 208 form another. The capacitance between plates 203 and 207 is measured through wires 210 by capacitance sensor 211, while the capacitance between plates 204 and 208 is measured through similar wires 210 by capacitance sensor 212.

A force on stick 201 deforms springs 206 and changes the distance between the two sets of plates. This changes the capacitance measured by sensors 211 and 212. If stick 201 is pushed to the left, the capacitance measured by sensor 211 will increase, while the capacitance measured by 212 will decrease. Conversely, if the stick is pushed to the right, sensor 211's reading will decrease, while sensor 212's will increase. If the stick is pushed down, both sensor readings will increase, while if the stick is pulled up, both readings will decrease. With two capacitance sensors, measurements can be made of the displacement of stick 201 in both the horizontal and vertical directions. Thus, by knowing the force vs. displacement curve for springs 206, one can determine the horizontal and vertical force applied to the stick 201 by comparing the readings of sensors 211 and 212 to their baseline readings.

To obtain cursor motion from the stick, the capacitance measurements from sensors 211 and 212 are processed as follows. If C1 is the capacitance measured by sensor 211 and C2 is the capacitance measured by sensor 212, then ΔX=C2–C1 computes the sideways displacement of stick 201 and hence the direction and degree of cursor motion that results. Also, Z=C1+C2 indicates the total downward pressure on stick 201, which may be used by the host computer to implement "press to select" or other gestures. A "press to select" gesture (see U.S. Pat. No. 5,696,535) activated when a sharp increase in downward pressure (Z) is detected on the stick. It functions similarly to a button click on a standard computer mouse. It is usually used to select or activate the item on the computer screen under the computer cursor.

Those experienced in the art will recognize that plates 203, 204, 207 and 208 may be actual metal plates, or they may equivalently be conductive regions formed in a variety of ways, including but not limited to conductive ink painted or screened on a surface or substrate, conductive material such as indium tin oxide painted or otherwise disposed on a surface or substrate, or any other conductive objects with substantially flat portions placed in close proximity to each other to form a capacitor between the opposed plates. Although flat plates are presently preferred, other configurations for variable capacitors are possible and well known such as sets of moving interdigitated plates, or a conductive plunger moving within a conductive cylinder. The dielectric 209 may be a bladder filled with a fluid such as water or carbon dioxide, a deformable solid such as rubber or silicone gel, or some combination thereof whose thickness will vary with the force applied to stick 201 and whose dielectric constant yields a conveniently measurable capacitance. Springs 206 may be coil springs, leaf springs, any sufficiently elastic solid, or any other arrangement that will provide a displacement predictably related to the force applied to it. In the preferred embodiment, springs 206 are chosen to be linear so that the capacitance measurements will vary linearly with applied force. Any non-linearity of the springs may be corrected if needed by numeric processing of the capacitance measurements.

Figure 3A:
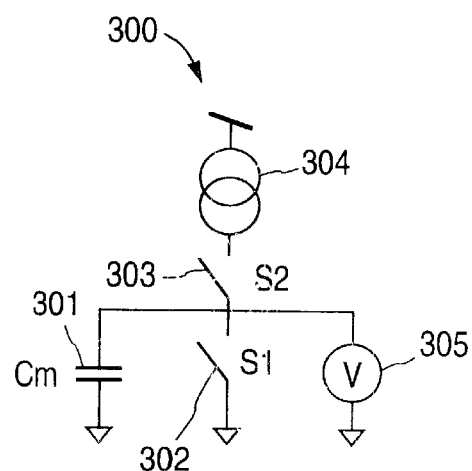

There are several methods of capacitance sensing known in the art. FIG. 3A shows a simplified capacitance measuring circuit 300 that has preferred characteristics for force sensing. U.S. Pat. No. 5,914,465, the disclosure of which is incorporated by reference, shows the complete implementation of the preferred circuit. To measure capacitance Cm 301, switch S1 302 is closed allowing capacitor 301 to discharge to ground. Switch S1 302 is then opened and switch S2 303 is closed allowing current source 304 with constant current I to charge capacitor 301 for a known length of time t. Switch S2 303 is then opened and the voltage on the capacitor is measured by voltage sensor 305.

Figure 3B:
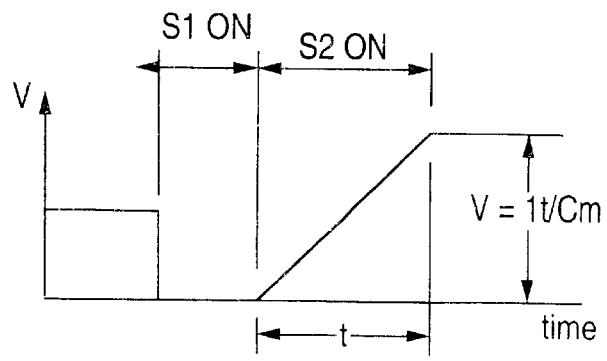

FIG. 3B shows the output of voltage sensor 305 during the measurement process. The voltage drops to ground as switch S1 302 is opened. As switch S1 302 is closed and switch S2 303 is opened, the voltage ramps up. When switch S2 303 is opened, the voltage measured flattens off. This voltage will be related to capacitance Cm as:

$$V=It/Cm$$

Where:
I=The current output of constant current source 304
t=The length of time that switch S2 303 is closed In the case of the capacitive pointing stick described above:

$$Cm=Cs+Cb$$

Where:
Cb=The capacitance in the system other than the sensor capacitance.
Cs=$\epsilon A/d$, The sensor capacitance.
Where:
A=The area of the plates of the capacitor
d=The distance between the plates of the capacitor
$\epsilon$=The dielectric constant of the material between the plates Therefore, the voltage measured will be:

$$V=It/(\epsilon A/d+Cb)$$

If the sensor capacitance, Cs, is much greater than the background capacitance, Cb, then Cb can be disregarded and:

$$V=Itd/\epsilon A$$

The circuit output (the voltage read by sensor 305) will be directly proportional to the distance between the plates, and therefore directly proportional to the force applied to the stick. If, however, the background capacitance becomes too large in relation to the sensor capacitance, then the sensors will have an inherent non-linearity.

Even if Cb is small compared to Cs, in practice, it can never be zero, and thus the Cm measurement will take on a nonzero value when the stick is at rest (with no force applied.) To compensate for this, the capacitance measurements are noted at a time when no pressure is applied. During operation, these saved measurements are subtracted from the current capacitance measurements to obtain a calibrated capacitance measurement.

Figure 2B:
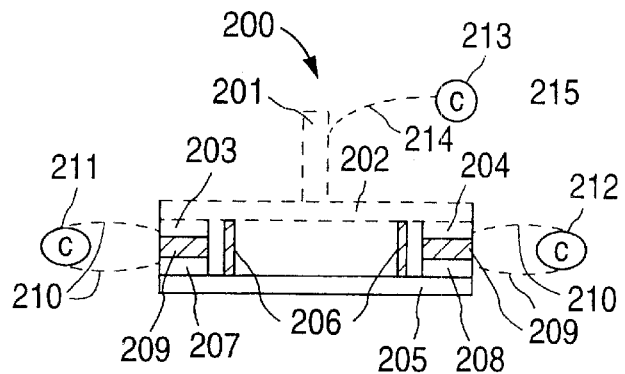

FIG. 2B shows a refinement to the embodiment shown in FIG. 2A. In this embodiment, stick 201 is conductive and connected to a third capacitance sensor 213 by wire 214. Wire 215 connects the other terminal of sensor 213 to ground. Support member 202 is made from some non-conductive material and stick 201 acts as a touch sensor to detect the user's finger on the stick. When no finger is detected on stick 201, the stick must be at rest and readings are taken for calibration purposes. When a finger is detected on stick 201, readings are taken and used to determine cursor motion.

Those experienced in the art will recognize that finger detection can also be accomplished with any of a number of alternate switches, such as those described in U.S. Pat. No. 5,541,622, the disclosure of which is incorporated by reference. Finger detection can also be used to suppress cursor motion when no finger is present, eliminating cursor motion due to electrical interference, temperature changes, vibration of the stick, or accidental miscalibration. In addition, finger detection can be used to refine "press-to-select" and similar gestures.

Many alternate methods for capacitance sensing are well known in the art. For example, in an alternate embodiment, capacitor plates 207 and 208 of FIG. 2A could be attached to an AC signal source instead of to ground, and capacitance sensors 211 and 212 could measure the amplitude of the coupled AC signal on plates 203 and 204.

For purposes of further discussion, reference is made to the plate of the capacitor connected to the sensing circuit as the sensing plate. The opposite plate is referred to as the non-sensing plate. Thus, one implementation of pointing stick 200 has the upper plates (203 and 204) as the sensing plates and the lower plates (207 and 208) grounded. Another implementation has the lower plates as the sensing plates while the upper plates are grounded. A third implementation has the upper plates as the sensing plates while the lower plates are driven by an AC signal. A fourth implementation has the lower plates as the sensing plates, while the upper plates are driven by the AC signal. In another embodiment, the non-sensing plates are capacitively coupled to a nearby, grounded object.

In a preferred embodiment, the non-sensing plates, whether grounded or driven by some signal, may be connected together into one plate. Thus, plates 203 and 204 can be combined with support member 202 into one conductive component, greatly simplifying the construction of the pointing stick. If, in addition, stick 201 is made conductive as well, then the user's finger on stick 201 will provide sufficient capacitance to obviate the need to ground the conductive component comprised of stick 201, member 202, and plates 203 and 204.

In order to minimize the background capacitance, and to reduce the circuit's susceptibility to electrical interference, it is desirable to keep sensors 211 and 212 as close as possible to the sensing plates. For this reason, one useful embodiment of the pointing stick shown in FIG. 2A has base 204 as a printed circuit board (PCB) with the components of sensors 211 and 212 on the board. If the sensors 204 are large copper traces on that PCB, then the entire assembly may consist of a one sided PCB with sensing components, sensor traces, springs, plate and stick all mounted on the same side. Other embodiments may include some components on the opposite side of the PCB to reduce the overall space requirements for the stick; for example, see U.S. Pat. No. 5,956,018. Other embodiments may include carrying the capacitive signals away from the sensing plates with shielded wires to reduce electrical noise susceptibility of the pointing stick. The shield for the signal wires may be grounded, or it may be driven with an AC signal as disclosed in U.S. Pat. No. 5,861,583 in order to minimize the background capacitance arising from transcapacitance between the shield and the signal wires.

Figure 4:
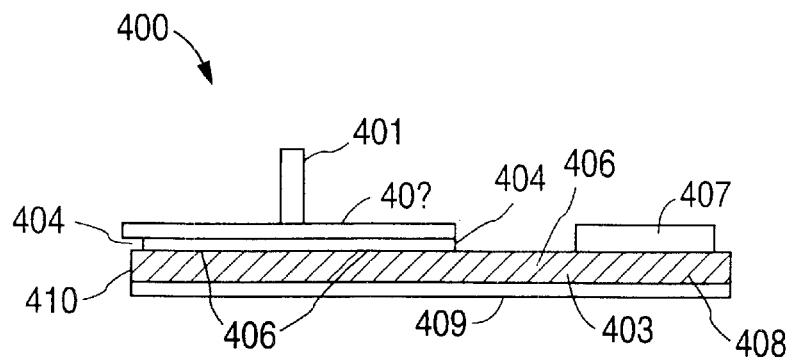

FIG. 4 shows one preferred embodiment of pointing stick 400. The stick 401 is rigidly attached to plate 402. Plate 402 is attached to PCB 403 by springs 404. Sensing plates 405 are broad electrical traces printed on the surface of PCB 403 opposite plate 402. The stack of plate 402, an air gap, and sensing plates 405 make up the FSC's of the pointing stick. Sensing plates 405 are connected by circuit trace 406 to sensor components 407. The sensor components 407 are connected by circuit via 408 through PCB 403 to ground plane 409. Ground plane 409 is connected to plate 402 through springs 404 and circuit via 410. In this configuration, the sensing plates 405 are shielded above and below by grounded plates. While this will increase the background capacitance, it will greatly reduce the susceptibility of the pointing stick to outside noise sources such as cellular phones, PC monitors, or LCD backlights.

Figure 5:
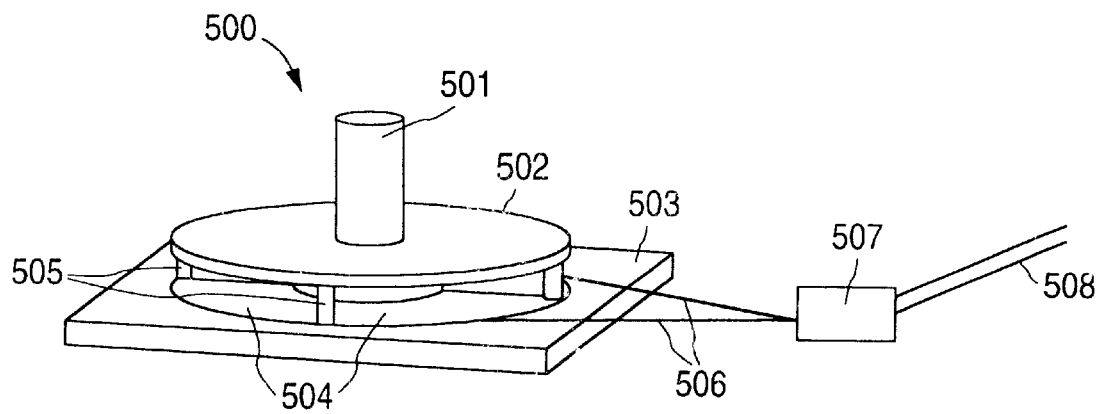

FIGS. 2 and 4 depict one-dimensional pointing sticks, but in the preferred embodiment, a pointing stick is two-dimensional. FIG. 5 shows one embodiment of a two-dimensional capacitive pointing stick 500. Stick 501 is rigidly attached to conductive plate 502. Base 503 has conductive plates 504 located opposite plate 502. Plate 502 is attached to base 503 by springs 505. Wires 506 connect plates 504 to processor 507. A force on stick 501 deflects springs 505, causing a change in the position of plate 502 relative to sensing plates 504. This deflection results in a change in capacitance between plates 502 and 504. Processor 507 compares the relative capacitive signals of plates 504 and thereby determines the direction and magnitude of the applied force. Processor 507 then converts this information into cursor motion, which is sent to the host via cable 508.

Those skilled in the art will recognize that the calculations on the capacitance measurements generalize easily from the one-dimensional case to the two-dimensional case. Motion $\Delta X$ is computed by subtracting the measurements from the two plates on either side of the sensor; $\Delta Y$ is similarly computed by subtracting the measurement of the remaining two plates. Downward pressure Z can be computed by summing all four capacitance measurements.

It will be obvious from the discussions above that plate 502 may be subdivided into a plurality of non-sensing plates. Other embodiments have the sensing plates attached to plate 502 while the non-sensing plates are located in position 504. While FIG. 5 shows four sensor plates, other pointing stick embodiments may have as few as two sensors (for a one-dimensional stick) up to any number of desired sensing and non-sensing plates.

Figure 6:
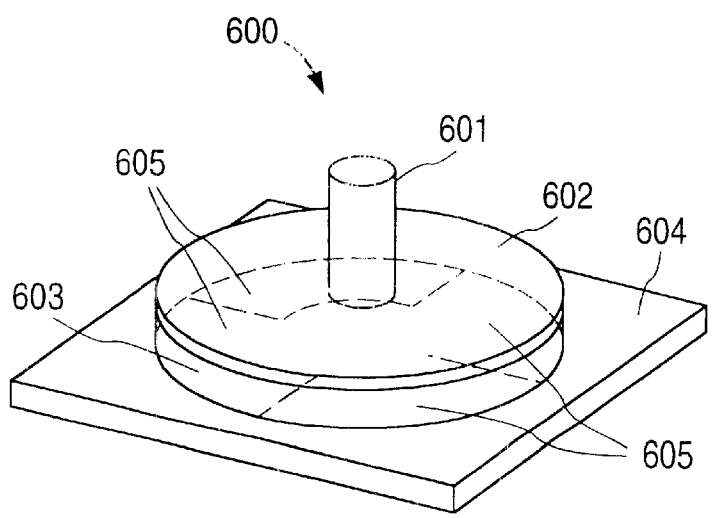

FIG. 6 shows another embodiment of capacitive stick 600. In this case, stick 601 is rigidly attached to a metal plate 602. A non-conductive elastic sheet 603 is attached to both plate 602 and base 604. A plurality of sensors 605 lies on base 604 opposite plate 602. Forces applied to stick 601 will deform elastic sheet 603 and change the distance between plate 602 and sensors 605. This change in capacitance can be measured by any of the methods mentioned above. This embodiment has certain advantages over the one shown in FIG. 4. The elastic sheet will have a higher dielectric constant than air, allowing for a higher and easier to measure capacitance level. In addition, the elastic sheet keeps dirt and debris from getting in between the plate and the sensors, which could potentially interfere with the normal function of the stick. Additionally, the plate, elastic sheet, and sensors can be attached together with any of a number of inexpensive and easily available adhesives, eliminating the need for expensive fasteners.

It will be obvious to those skilled in the art that the elastic sheet 603 could instead be a ring around the outside of plate 602. This would allow air to be used as the dielectric between plate 602 and sensors 604 while still providing a dust and liquid seal. In this particular case, the seal must be vented if the stick is to measure vertical (Z) force.

Figure 7:
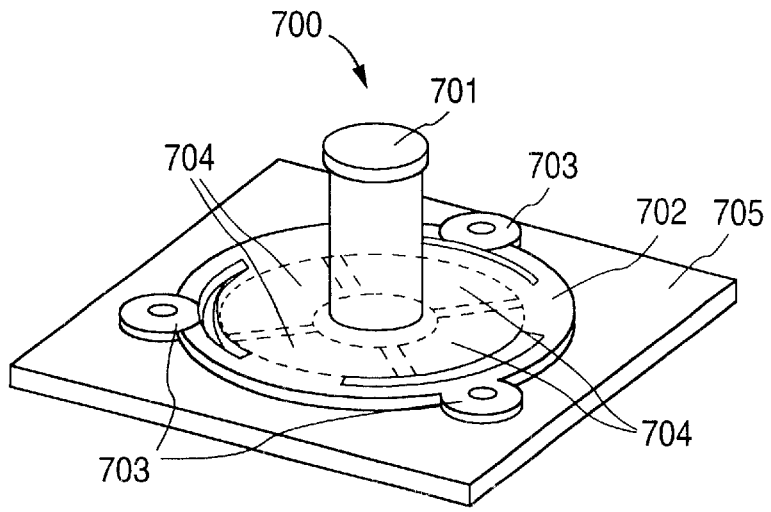

FIG. 7 shows a further preferred embodiment of a capacitive stick 700. Stick 701 is firmly attached to spring 702. Spring 702 is formed such that legs 703 bent from the flat form of the spring provide an air gap between the flat body of the spring and the sensors 704, which lie on base 7Q5. Spring 702 may be attached to base 705 in many different ways, including, but not limited to, screws, rivets, or other fasteners; adhesives; soldering; or welding. When a force is applied to stick 701, spring 702 deforms, changing the distance between the plate like portion of the spring and the sensors 704. This causes a change in the capacitance between the sensors and the plate, which may be measured in any of the well-known methods.

The spring/plate combination shown in FIG. 7 depicts a spring with three legs and three-fold symmetry. Other embodiments may include any number of legs and also any number of symmetric divisions, depending on the needs of the particular application. However, it is important that the spring maintain a consistent relationship between force and displacement for forces applied at any angle.

This embodiment has several advantages. First, the plate and spring have been combined into one component, allowing for simplification of the assembly process. Second, if the spring is made of metal, and the base 705 is a PCB, the attachment points between the spring and the base allow for a simple method of connecting the spring to the desired portions of the sensing circuit. Third, if fasteners such as rivets or screws are used to attach the spring to the base, the stick may be easily and accurately centered over the sensor array by aligning the mounting holes in the base with the mounting holes in the spring. In addition, if fasteners are used to connect the spring 702 to the base 704, these fasteners may be used hold the stick in its desired mounting position.

Figure 8A:
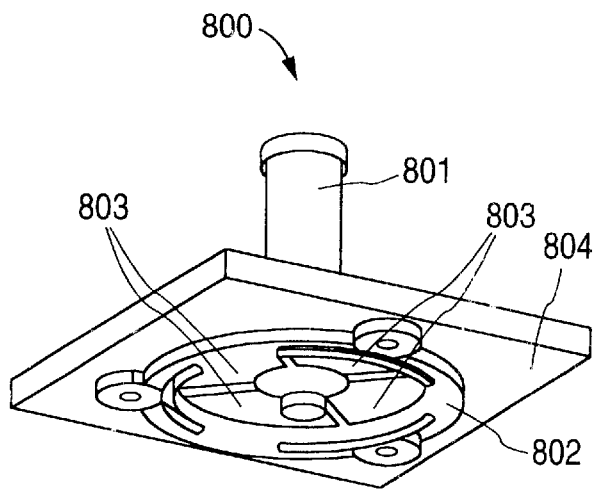
Figure 8B:
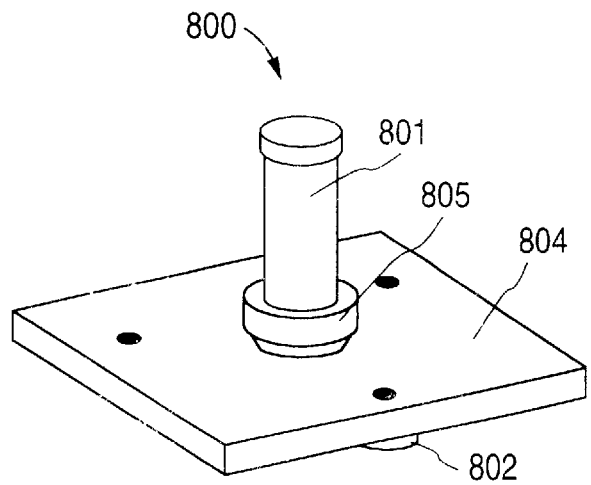

FIGS. 8A and 8B show two views of an alternative embodiment 800 to the single plate and spring stick shown in FIG. 7. In this case, stick 801 passes through base 804 to attach to spring 802. Spring 802 is attached to the underside of base 804 by any of the aforementioned methods. In this case, downward force on stick 801 will cause spring 802 to move away from sensors 803, causing a decrease in capacitance between the plate portion of spring 802 and the sensors 803. This change in capacitance can be easily measured in any of the aforementioned ways, and the conversion of this capacitance change to cursor motion is similar to that for FIGS. 2–7 except that all the capacitance changes have the opposite sign.

This particular embodiment of the stick eliminates any danger of spring 802 bottoming out on sensors 803. It is undesirable for the spring to bottom out because this would short the two plates of each capacitor together, rendering the capacitance measurement invalid. However, it may be necessary to include overload ring 805 to prevent extreme forces applied to stick 801 from permanently deforming spring 802. When large downward forces are applied to stick 801, overload ring 805 will come into contact with base 804. Any additional force will be distributed directly to base 804, preventing unwanted damage to spring 802. This embodiment also allows for the spring and all associated sensing circuitry to be mounted on the bottom of the base 804, leaving the top side of the base clear for mounting to the underside of a bezel or keyboard. This configuration also reduces the circuitry's exposure to spilled liquids or other debris falling in from the direction of the user.

It will be obvious to anyone skilled in the art that this "upside down" configuration of the stick can be applied to any of the aforementioned embodiments of the stick.

We claim:

1. A device for entering data into a computer and for manipulation of a cursor comprising in combination, a joystick, a conductive spring and at least one capacitive force sensor wherein said conductive spring is capable of being deflected by force applied to said joystick which is measured by said at least one capacitive force sensor.

2. The device of claim 1 wherein said spring is mounted to a substrate forming a gap between the spring and substrate, said gap forming the dielectric of the capacitance measured by said at least one capacitive force sensor.

3. The device of claim 2 wherein said gap contains air as its primary dielectric material.

4. The device of claim 2 wherein said spring is shaped to form said gap between said spring and substrate.

5. The device of claim 1 wherein said spring is mounted to a substrate by conductive fasteners, said fasteners forming an electrical connection between said spring and substrate.

6. The device of claim 1 wherein said spring is mounted to a substrate by fasteners, said fasteners holding said spring in alignment with the substrate.

7. The device of claim 2 wherein said gap contains a dielectric material whose dielectric constant is greater than that of air.

8. The device of claim 7 wherein said dielectric comprises a fluid contained within a bladder.

9. The device of claim 7 wherein said dielectric comprises a compressible solid.

10. The device of claim 2 wherein said substrate comprises a printed circuit board.

11. The device of claim 10 wherein said printed circuit board is provided with circuit traces which act as a second plate of said at least one capacitive force sensor.

12. The device of claim 10 wherein said printed circuit board contains sensing circuitry for operating said capacitance force sensor.

13. The device of claim 2 wherein said spring is mounted to one side of said substrate and said force is applied from a second side of the substrate.

14. The device of claim 13 wherein said joystick passes through a hole in said substrate.

15. The device of claim 14 wherein a ring is fixed to said joystick to reduce excessive deformation of said spring.

16. The device of claim 1 further comprising a capacitive touch sensor to indicate when a finger is touching said joystick.

17. The device of claim 16 wherein said capacitive touch sensor and capacitive force sensor are operated by a single capacitive sensing circuit.

* * * * *